US006721571B2

(12) United States Patent
Tran et al.

(10) Patent No.: US 6,721,571 B2
(45) Date of Patent: Apr. 13, 2004

(54) WIRELESS NETWORK INFRASTRUCTURE IN THAT DIGITAL PROCESSING RESOURCES ARE SHARED

(75) Inventors: Scott H. Tran, Plano, TX (US); Farhad Bassirat, Plano, TX (US); Chang-Gang Zhang, Plano, TX (US); Kendall Martin, Wylie, TX (US)

(73) Assignee: Nortel Networks Ltd., St. Laurent (CA)

( * ) Notice: Subject to any disclaimer, the term of this patent is extended or adjusted under 35 U.S.C. 154(b) by 458 days.

(21) Appl. No.: 09/738,204

(22) Filed: Dec. 15, 2000

(65) Prior Publication Data

US 2002/0077149 A1 Jun. 20, 2002

(51) Int. Cl.$^7$ .................................................. H04Q 7/20
(52) U.S. Cl. ........................ 455/453; 455/450; 455/446; 455/422.1
(58) Field of Search ................................. 456/403, 422, 456/446, 447, 560, 561, 562.1, 436, 438, 439, 442, 443, 450, 507, 524, 453, 451, 452.1, 454, 422.1, 452.2

(56) References Cited

U.S. PATENT DOCUMENTS

| | | | | |
|---|---|---|---|---|
| 5,960,349 A | * | 9/1999 | Chheda et al. ............... | 455/446 |
| 6,148,201 A | * | 11/2000 | Ernam et al. ................ | 455/433 |
| 6,160,798 A | * | 12/2000 | Reed et al. .................. | 455/437 |
| 6,347,224 B1 | * | 2/2002 | Smyth et al. ................ | 455/406 |
| 6,414,947 B1 | * | 7/2002 | Legg et al. .................. | 455/442 |

* cited by examiner

*Primary Examiner*—Nay Maung
*Assistant Examiner*—John J Lee
(74) *Attorney, Agent, or Firm*—Bruce Garlick (57) ABSTRACT

A wireless communication system infrastructure services wireless communications within a service coverage area. A digital enclosure includes a plurality of wireless communication processing components that perform digital processing functions. A plurality of radio enclosures couple to the digital enclosure via communication links and each service wireless communications within a corresponding geographic area of the service coverage area. During operation of the wireless communication system infrastructure, two radio enclosures of the plurality of radio enclosures share a communication processing component of the digital enclosure while jointly servicing a single wireless communication. The two radio enclosures reside at respective geographic locations that are separated by a geographic distance such that each of the radio enclosures services a respective cell. Each of the radio enclosures may service a plurality of sectors that form the cell. The digital enclosure couples to a base station controller, which in turn couples to a mobile switching center and, in some embodiments, to the Internet. Further, the mobile switching center couples to the public switched telephone network. During handoff of the wireless communication in a CDMA system from a first cell to a second cell, a core of the digital enclosure couples a channel element to a plurality of radio enclosures, each of which services a cell/sector(s) participating in the handoff. In one handoff operation in which six-way handoff is performed, the core couples a channel element of the digital enclosure to three radio modules, each of which services two sectors participating in the handoff.

20 Claims, 8 Drawing Sheets

WIRELESS NETWORK INFRASTRUCTURE IN THAT DIGITAL PROCESSING RESOURCES ARE SHARED

BACKGROUND

1. Technical Field

The present invention relates generally to cellular wireless communication networks; and more particularly to the network infrastructures of such a cellular wireless communication networks.

2. Related Art

Cellular wireless networks include a "network infrastructure" that facilitates wireless communications with wireless mobile terminals operating within a corresponding service coverage area. The network infrastructure couples to other networks, e.g., the Public Switched Telephone Network (PSTN), the Internet, etc, to support communication between the mobile terminals and the other networks. The wireless mobile terminals operating within a service coverage area of the network infrastructure wirelessly communicate with base stations of the network infrastructure. The network infrastructure routes the communications between the base stations and other mobile terminals and to terminals coupled to the other networks as well.

Wireless interface standards have been promulgated to standardize wireless communications between the mobile terminals and the base stations of the network infrastructure. Wireless interface standards include, for example, the Advanced Mobile Phone Service (AMPS) standards, the Global System for Mobile telecommunications (GSM) standards, the Code Division Multiple Access (CDMA) standards and the Time Division Multiple Access (TDMA) standards. Generations of these standards are generally referred to as first generation (1G), second generation (2G), third generation (3G), fourth generation (4G), etc. Each advancing generation of standards typically supports a greater number of services, a greater number of features, and provides better communication qualities. Resultantly, network infrastructures supporting these superior service offerings must provide increased performance levels, both from a network infrastructure perspective and from a wireless link perspective.

To increase performance within the network infrastructure, components having greater processing capability are deployed. For example, a newer MSC (or equivalent network components within an IP based network infrastructure) has capacity to service a far greater number of calls (and other services) than older MSCs. Further, the topology of the network infrastructure may also be altered to offload some service functions from one network infrastructure component to a plurality of network infrastructure component.

Increasing wireless link capacity is a much more difficult problem to solve. Because allocated frequency spectrum is fixed for a given wireless communication system deployment, improvements that increase wireless link capacity within the service coverage area must fit within this limitation. One common solution used to increase overall wireless link capacity within a service coverage area is to subdivide cells into smaller components, i.e., sectors. Currently deployed cells are now typically subdivided into three sectors. To further increase the wireless capacity of each cell, the cell may be divided into six, or more sectors. In each of these configurations, a single base station services all of the sectors of the cell. Complex antenna and processing structures are then required to support the wireless terminal traffic within the sectors.

Another solution to increasing wireless link capacity within a service coverage area is to deploy additional base stations. In the new deployment, a plurality of base stations, each serving a respective cell, service the geographic area that was previously serviced by a single base station. Base stations, including a Base Transceiver Subsystem (BTS), an antenna and a link to other network infrastructure components, e.g., a Base Station Controller (BSC) are both expense to acquire and expensive to deploy. Simply acquiring a location for the deployment of the base station, particularly in highly congested areas, is an expensive undertaking. In some urban areas, locations of sufficient size at which to deploy base stations may be nearly impossible to acquire. In these cases, the cost of the location may be exorbitant, but a cost that the service provider has not choice but to pay.

Further, the greater number of base station deployments increases network infrastructure operating complexity. In systems that subdivide the allocated frequency spectrum, e.g., TDMA systems, frequency reuse complexity and inter-cell interference problems increase with an increased number of deployed base stations. In systems that share spectrum among mobile terminals, e.g., CDMA (IS-95, IS-2000, WCDMA, GSM-2000, etc.), the noise floor increases for all mobile terminals. Further, in both CDMA and TDMA systems, the number of handoffs increases with the number of base stations. An increased number of handoffs during any given communication significantly increases both the processing requirements placed on the network infrastructure and the likelihood of dropped calls.

Thus, there is a need in the art for improvements in network infrastructure that result in increased wireless link capacity, that require fewer network infrastructure components, that reduce the complexity of operation of the network infrastructure, and that simplify handoff operations.

SUMMARY OF THE INVENTION

Thus, to overcome the shortcomings of the prior systems, among other shortcomings, a wireless communication system infrastructure of the present invention services wireless communications for mobile terminals operating in a service coverage area and includes a digital enclosure and a plurality of radio enclosures. The digital enclosure includes a plurality of wireless communication processing components that perform digital processing functions. The plurality of radio enclosures couple to the digital enclosure via communication links and each service wireless communications within a corresponding geographic area of the service coverage area. During operation of the wireless communication system infrastructure, two radio enclosures of the plurality of radio enclosures share a communication processing component of the digital enclosure while jointly servicing a single wireless communication.

The two radio enclosures reside at respective geographic locations that are separated by a geographic distance such that each of the radio enclosures services a respective cell. Further, each of the radio enclosures may service a plurality of sectors that form the cell. The digital enclosure couples to a base station controller, which in turn couples to a mobile switching center and, in some embodiments, to the Internet. Further, the mobile switching center couples to the public switched telephone network. In combination, these elements service the wireless communication.

The digital enclosure includes a core, a plurality of channel element modules coupled to the core, a control module coupled to the core, and additional components required for servicing the wireless communication. The core couples the control module and a channel element of a channel element module to at least one radio enclosure to service the wireless communication. During handoff of the wireless communication in a CDMA system from a first cell to a second cell, the core couples a channel element of the channel element module to a plurality of radio enclosures, each of which services a cell/sector(s) participating in the handoff. In one handoff operation in which six-way handoff is performed, the core couples a channel element of a channel element module within a channel element module of the digital enclosure to three radio enclosures. In this a handoff scenario, the channel element is coupled to two radio modules in each of the three radio enclosures, the two radio modules servicing two sectors participating in the handoff. Thus, a single channel element is used to service a wireless communication where three channel elements (in three separate base stations) would be required in prior systems.

Thus, the system of the present invention provides many important advantages and efficiencies over prior systems. By pooling digital communication processing elements (such as channel element modules, cores, control modules, and other digital communication processing elements) among multiple radio enclosures, system resources are more efficiently used. Thus, as contrasted to prior systems, additional wireless communications may be serviced according to the present invention using the same number of digital communication processing elements.

According to the present invention, only the radio enclosures need be deployed at a cell site. By reducing the equipment deployed at the cell site, the cell site occupies a smaller mechanical footprint. Such reduction reduces the lease cost for the cell site. Further, because of the smaller required mechanical footprint area, cell sites may be deployed at locations that were previously not sufficiently large for cell deployment.

Further, because the radio enclosures do not include digital communication processing elements, they are functionally simpler and, resultantly, simpler to deploy, configure, and commission. Moreover, by using digital enclosures that service a plurality of radio enclosures, the wireless communication system infrastructure is more cost effective to deploy and easier to expand. Such reduced costs in expansion are particularly important when backhauling systems for multiple carrier applications.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
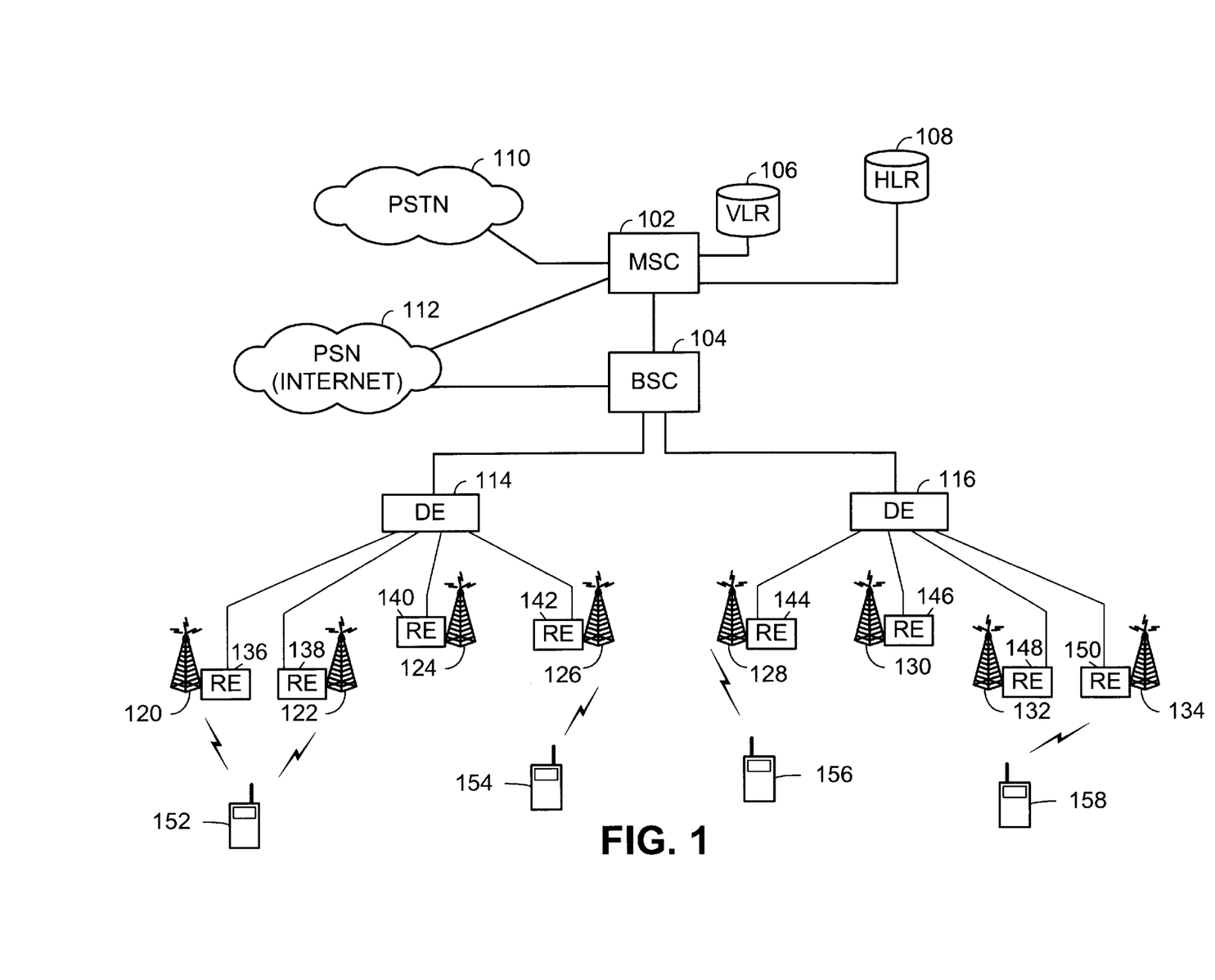
FIG. 1 is a system diagram illustrating a portion of a cellular wireless communication system constructed according to the present invention.

FIG. 1 is a system diagram illustrating a portion of a cellular wireless communication system constructed according to the present invention. The system of FIG. 1 operates according to a CDMA wireless interface standard, e.g., IS-95A, IS-95B, CDMA 2000, W-CDMA, GSM-2000, etc. For a general description of such operations, refer to the corresponding operating standards, which are publicly available. In other embodiments of the present invention, the wireless communication system may be constructed to operate according to other wireless interface standards.

The portion of a cellular wireless communication system illustrated in FIG. 1 includes a mobile switching center (MSC) 102, a Base Station Controller (BSC) 104, a Visitor Location Register (VLR) 106, and a Home Location Register (HLR) 108. The MSC 102 couples to the Public Switched Telephone Network (110). The BSC 104 (and optionally, the MSC 102), couple to a Packet Switched Network, e.g., the Internet. A complete wireless communication system may include additional BSCs (not shown) and may include one or more additional MSCs (not shown).

The system of FIG. 1 services a plurality of mobile terminals 152, 154, 156, and 158 within a respective service area. Apart from the principles and teachings of the present invention, the aforementioned wireless communication network infrastructure components are generally known and will not be discussed herein except as it relates to the present invention.

The system of FIG. 1 also includes Digital Enclosures (DEs) 114 and 116 and Radio Enclosures (REs) 136, 138, 140, 142, 144, 146, 148, and 150. In prior art wireless communication networks a BSC coupled to a plurality of base stations. Each prior art base station included both digital processing elements and at least one Radio Frequency (RF) unit. According to the present invention, functions that were previously performed by prior art base stations are now performed jointly by DEs 114 and 116 and REs 136–150. Generally speaking, the DEs 114 and 116 perform digital processing functions while the REs 136–150 perform RF unit functions. The structure of the DEs 114 and 116 and the REs 136–150 as well as the manner in which these devices interact varies significantly from prior art base station implementations.

Each RE is co-located with a plurality of antennas and a support structure upon which the antennas mount, e.g., a tower, frame, or other fixed structure that places the supported antennas in an appropriate position to serve a set of sectors. The plurality of antennas coupled to each support structure may support dual polarization diversity schemes, space diversity schemes, or other schemes to enhance performance. REs 136, 138, 140, 142, 144, 146, 148, and 150 co-locate with antennas 120, 122, 124, 126, 128, 130, 132, and 134, respectively. DEs 114 and 116 perform digital processing for communications supported by their coupled REs 136–150. In the system of FIG. 1, DE 114 performs digital processing for calls serviced by REs 136, 138, 140, and 142 while DE 116 performs digital processing for calls serviced by REs 144, 146, 148, and 150.

The DEs 114 and 116 are physically isolated from the REs 136–150 but are coupled to the REs 136–150 by high-speed data links. In the described embodiment, the data links are fiber optic based. However, in other embodiments, copper, microwave, and/or other high-speed links couple the DEs 114 and 116 to the REs 136–150. The architecture in which a DE is coupled to a plurality of REs may vary from installation to installation, depending upon the unique requirements of each installation. Examples of particular coupling structures will be discussed further with reference to FIG. 5. In any coupling architecture, however, sufficient communication bandwidth between the DEs 114 and 116 and the REs 136–150 must exist to service all communications and control requirements.

Figure 2:
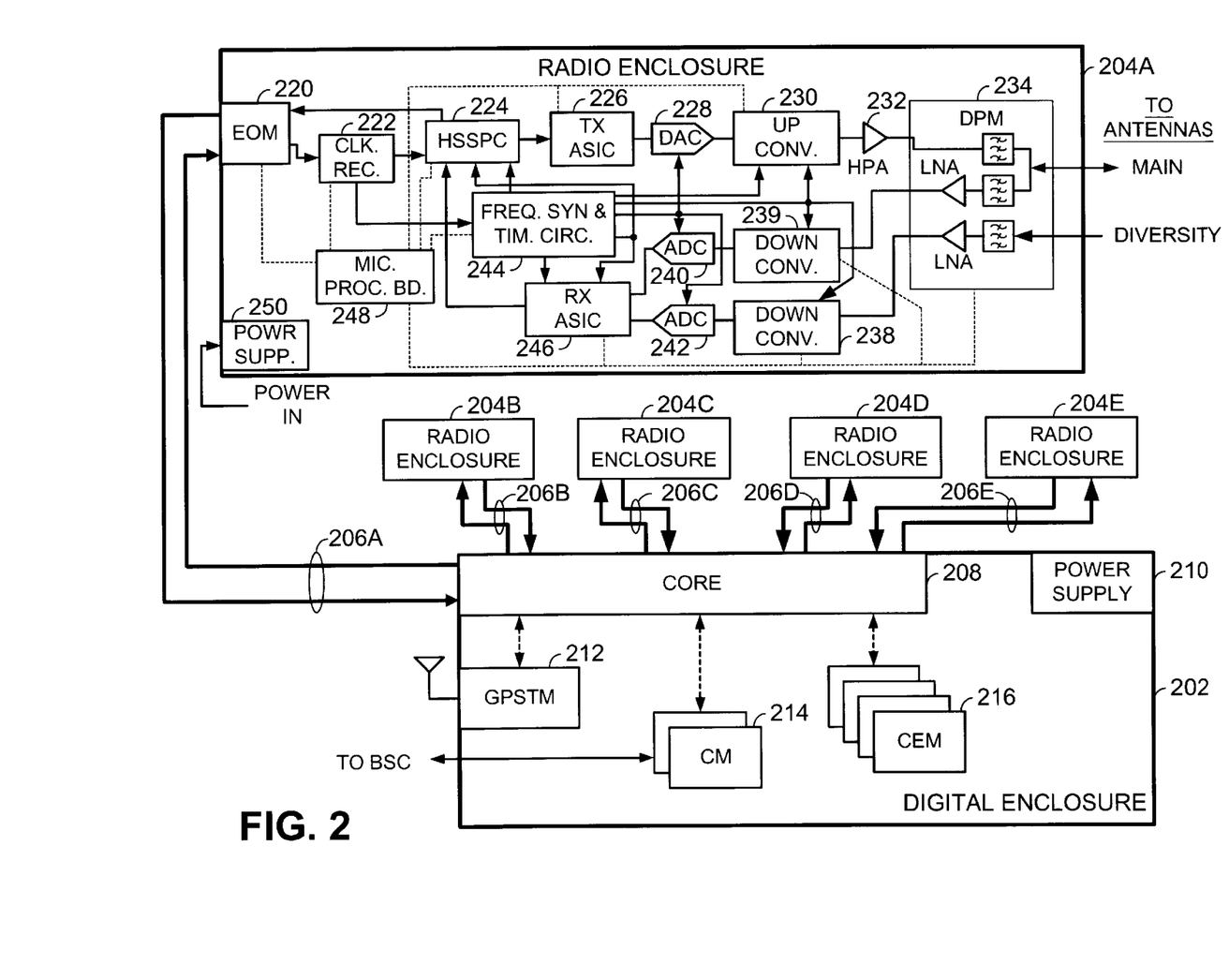
FIG. 2 is a block diagram generally illustrating construction of a Digital Enclosure and a Radio Enclosure according to the present invention.

FIG. 2 is a block diagram generally illustrating construction of a DE 202 and a plurality of REs 204A–204E constructed according to the present invention. The DE 202 includes a core 208, a power supply 210, at least one global positioning system-timing module (GPSTM) 212, at least one control module (CM) 214, and a plurality of Channel Element Modules (CEMs) 216. The structure and operation of these devices, excluding the functions specific to the present invention, are generally known and will not be discussed herein. A general description of these components may be found in Nortel Networks document No. 411-2133-110 dated January 2000 and entitled *Metro Cell & Minicell.* Each CEM consists of a plurality of channel elements, call elements, or cell site modems, as the case may be, depending upon the terminology employed. The term CEM is specific to Nortel Networks Ltd. Other vendors use differing terminology for devices that perform the same or similar functions and that are equivalent to the CEMs 216 described herein. The components of the DE 210 may be housed in a single enclosure that is protected from the environment.

The core 208 couples the DE 202 to a plurality of REs 204A–204E. The REs 204A–204E couple to the DE 202 via respective fiber optic connections 206A–206E. However, as was previously discussed, other types of connections may also server to couple the REs 204A–204E to the DE 202. According to the present invention, the core 208 facilitates the sharing of DE 202 components by the REs 204A–204E. Because the DE 202 is expensive and requires mechanical footprint space when deployed, by sharing the components of the DE 202 among the plurality of REs 204–204E, the number of required DE deployments decreases. Further, significant operational efficiencies are gained by such deployment, these operational efficiencies discussed in detail with reference to FIGS. 4, 6, 7, and 8.

Of the REs 204A–204E shown in FIG. 2, only the details of RE 204A are shown. However, REs 204B–204E are similarly constructed. Further, multiple instances of the components illustrated for RE 204A may be included in each RE. In one embodiment, each instance of these components is included for each sector supported by the RE. For example, if RE 204E serviced three sectors, RE 204E would include three instances of the components illustrated for RE 204A.

The RE 204A, as well as each other RE 204B–204E, includes an Electro-Optical Module (EOM) 220 that terminates the connection 206A, a clock recovery module 222, a High Speed Serial Protocol Control (HSSPC) 224, a Transmit ASIC 226, a digital-to-analog converter 228, an up converter 230, a high power amplifier 232, and a duplexer/LNA preselector/LNA module (DPM) 234. The RE 204A further includes down converters 238 and 239, analog-to-digital converters 240 and 242, frequency synthesizers and timing circuitry 244, a receive ASIC 246, a microprocessor 248, and a power supply 250. The RE 204A couples to main antennas and to diversity antennas.

While a particular structure has been shown for the RE 204A, other RE structures, as are generally known in the art may be employed with the DE 202. In some embodiments, prior art radio modules, such as the Nortel Flexible Radio Module (FRM), may be used in conjunction with the DE 202. However, in such case, the FRM must be proximate to the DE 202 to satisfy the limitations of the EOM of the FRM. With currently available EOM technology, this limit is approximately 1000 meters. However, as is evident, the link 206A between the RE 204A and the DE 202 may be of a greater distance as long as signal timing, signal magnitude, and signal delay operating limitations are satisfied.

Figure 3:
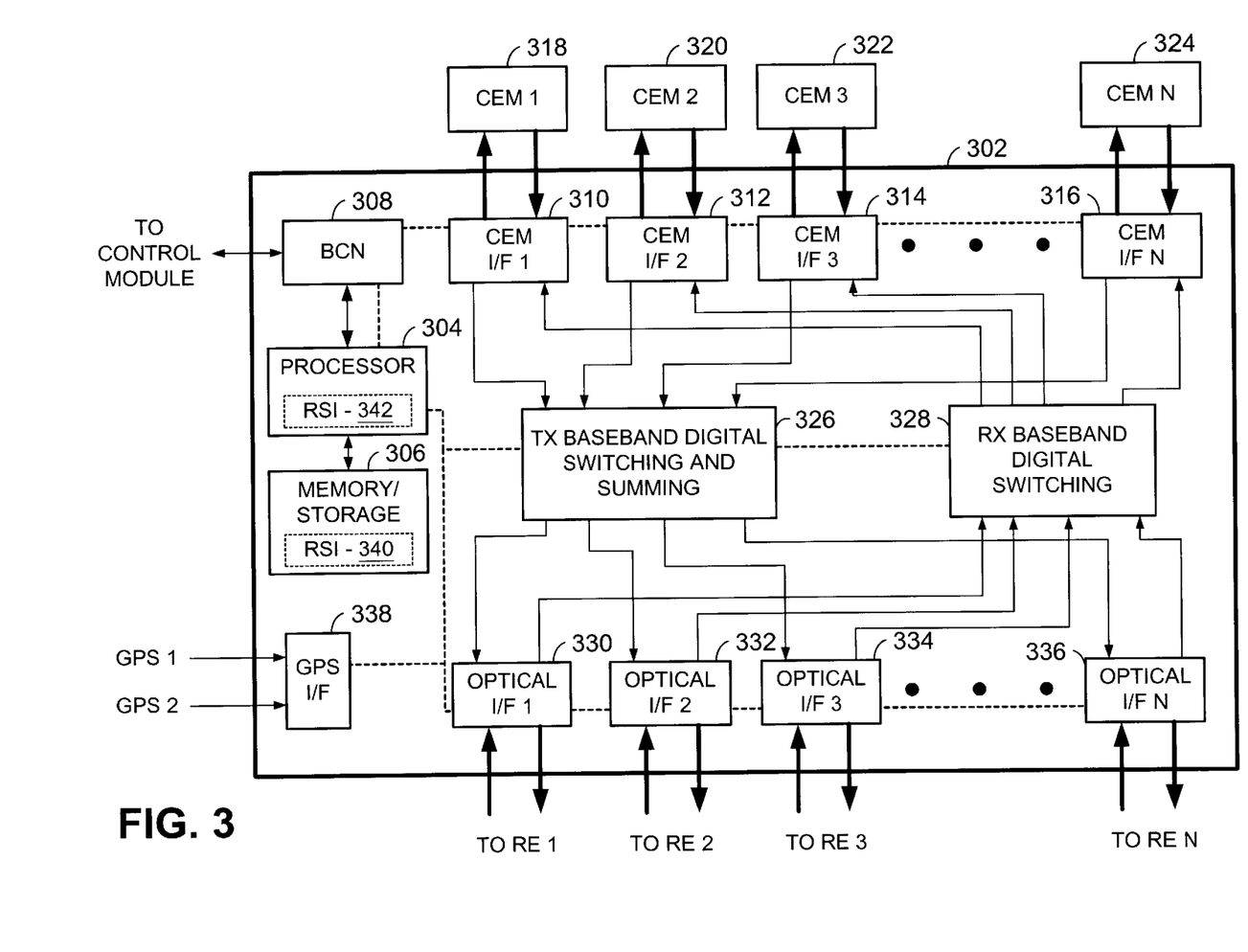
FIG. 3 is a block diagram generally illustrating a core constructed according to the present invention that resides within a Digital Enclosure.

FIG. 3 is a block diagram generally illustrating a core 302 constructed according to the present invention that resides within a Digital Enclosure, such as the DE 202 of FIG. 2. The core 302 couples to a plurality of REs (RE 1, RE 2, RE 3, . . . , RE N) via optical interfaces 330, 332, 334, and 336 and services communications with the REs. These communications may be both voice and data communications. In servicing the communications, the core 302 assigns, releases and reassigns DE resources, e.g., a plurality of CEMs, e.g., CEM 1 318, CEM 2 320, CEM 3 322, and CEM N 324 in the described embodiment. The core 302 couples to the CEMs 318–324 via respective CEM interfaces, CEM I/F 1 310, CEM I/F 2 312, CEM I/F 3 314, and CEM I/F N 316. Transmission Baseband Digital Switching and Summing circuitry 326 and Receive Baseband Digital Switching circuitry 328 route communications between the optical interfaces 330–336 and the CEM I/Fs 310–316.

A Baseband Communication Node (BCN) 308 couples to each of the CEM I/Fs 310–316 and routes communications from and to the CM 214 of the DE 202. A processor 304 couples to the BCN 308, the CEM I/Fs 310–316, the Transmission Baseband Digital Switching and Summing circuitry 326, the Receive Baseband Digital Switching circuitry 328, the Optical I/Fs 330–336, and to a GPS I/F 338. Memory 304, e.g., DRAM, SRAM, disk drive, etc., that is coupled to the processor 304 stores Resource Sharing Software Instructions (RSSI) 340.

During operations of the core 302, the RSSI 340 are loaded into the processor 304 as RSSI 342 and executed. Upon their execution, the processor 304 controls the BCN 308, the CEM I/Fs 310–316, the Transmission Baseband Digital Switching and Summing circuitry 326, the Receive Baseband Digital Switching circuitry 328, and the Optical I/Fs 330–336 to cause the core 302 to operate according to the present invention in sharing DE 202 resources among a plurality of REs. The processor 304 may be a microprocessor, an Application Specific Integrated Circuitry, or another processing device capable of performing digital processing operations. The processor 304 may be a general-purpose processor that has been specifically programmed to perform the operations of the present invention, may be a specialized circuit constructed in particular application, or a combination of such.

Figure 4:
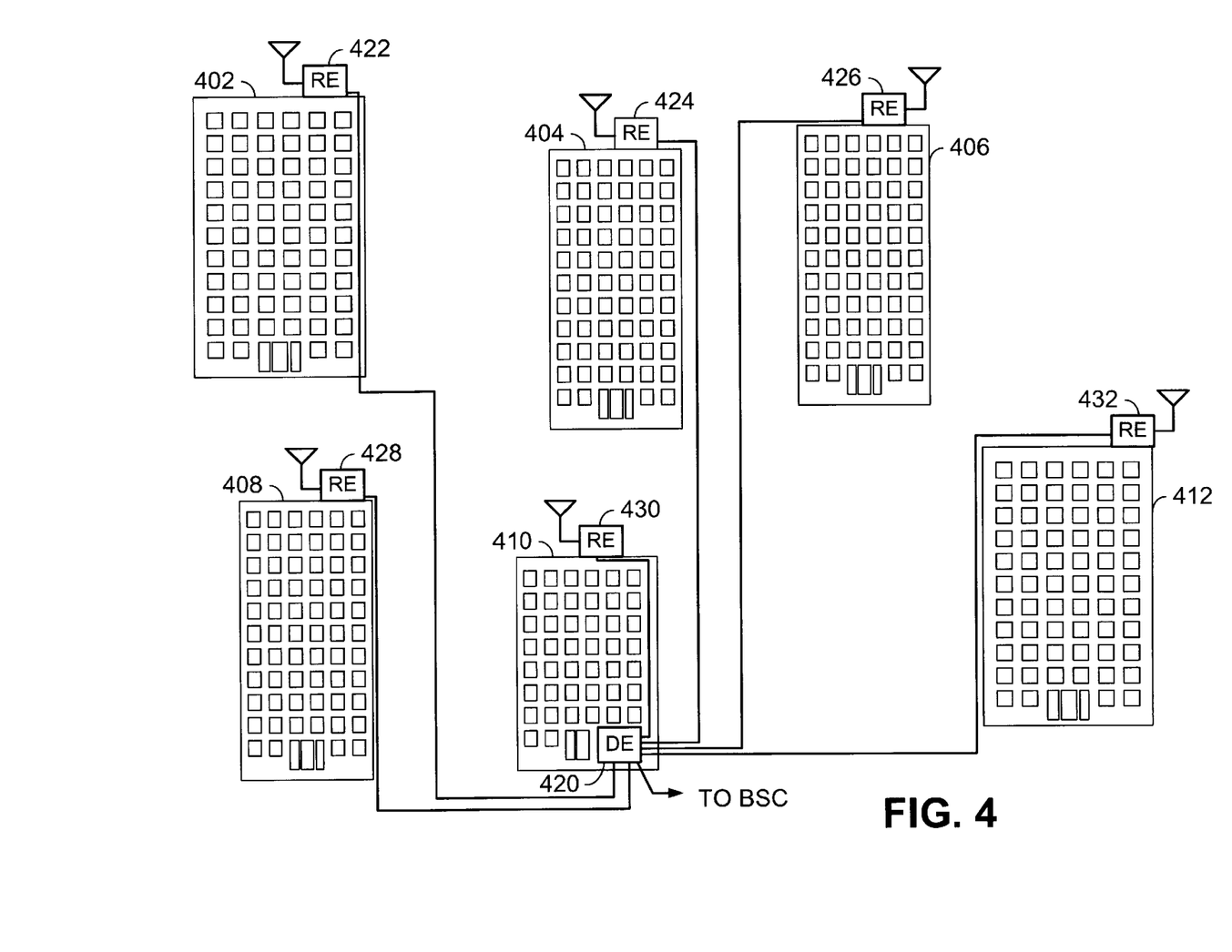
FIG. 4 is a block diagram illustrating the deployment of a wireless communication system network infrastructure according to the present invention within an urban area.

FIG. 4 is a block diagram illustrating an urban deployment of a wireless communication system network infrastructure according to the present invention. The urban area illustrated is typical of a large city business district in which a service provider must support a high mobile terminal density. In order to support this high mobile terminal density, a large number of cells, both macro cells and micro cells must be deployed. However, the cost of securing locations for each cell site is great and space for such cell site deployment is limited.

Thus, according to the present invention, a plurality of REs 422, 424, 426, 428, 430, and 432 are deployed upon buildings 402, 404, 406, 408, 410, and 412. Further, a single DE 420 supports all of the REs 422–432. By deploying the single DE 420 and the plurality of REs 422–432, the total cost of deployment is significantly less than a prior art deployment for the same number of serviced cells. Such is the case because a fewer number of network infrastructure components are deployed and because the overall mechanical footprint requirements for the network infrastructure components are reduced. In this urban setting the cost of each mechanical footprint is significant. As an additional benefit, the REs 422–432 are much smaller than conventional base station equipment. Thus, the REs 422–432 may be deployed in spaces that would be too small to deploy prior art equipment.

Figure 5:
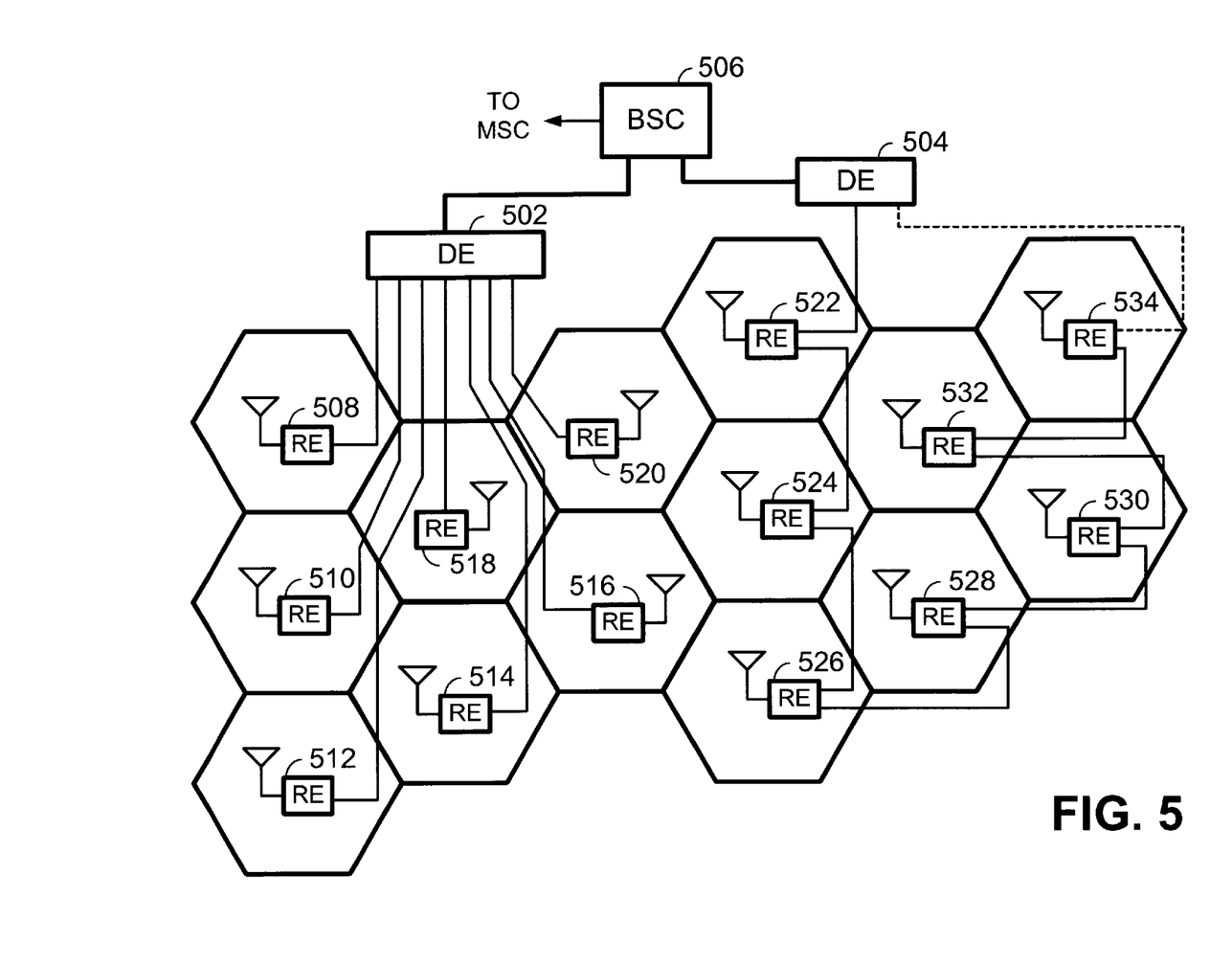
FIG. 5 is a block diagram illustrating two topologies for interconnectivity of a plurality of Digital Enclosures to a plurality of Radio Enclosures according to the present invention.

FIG. 5 is a block diagram illustrating two topologies for interconnectivity of a plurality of Digital Enclosures to a plurality of Radio Enclosures according to the present invention. As shown, DEs 502 and 504 both coupled to BSC 506. Further, DE 502 couples to REs 508, 510, 512, 514, 516, 518, and 520. DE 504 couples to REs 522, 524, 526, 528, 530, 532, and 534. Each of the REs 508–534 supports wireless communications within a respective cell or set of sectors. In combination, these cells/set of sectors form a portion of a respective service area.

A separate and unique physical link connects the REs 508–520 to the DE 502. This connection topology was previously described with reference to FIGS. 1 through 4. However, the connection topology between DE 504 and REs 522–534 differs from this topology. With the connection topology coupling DE 504 to REs 522–534, all REs 522–534 share a redundant communication path. As shown, RE 522 couples to DE 504. However, REs 524, 526, 528, 530, 532, and 534 couple only to other REs. Thus, signals passing between DE 504 and these REs 524–532 may pass through other of the REs. This network topology is sometimes referred to as a peer-to-peer topology. In another network topology sharing this general structure, a router is present at each RE. The router then routes communications among the REs. Redundant optic fibers coupling the routers would enhance the reliability of this network topology. Still other topologies may be employed without departing from the present invention.

Figure 6:
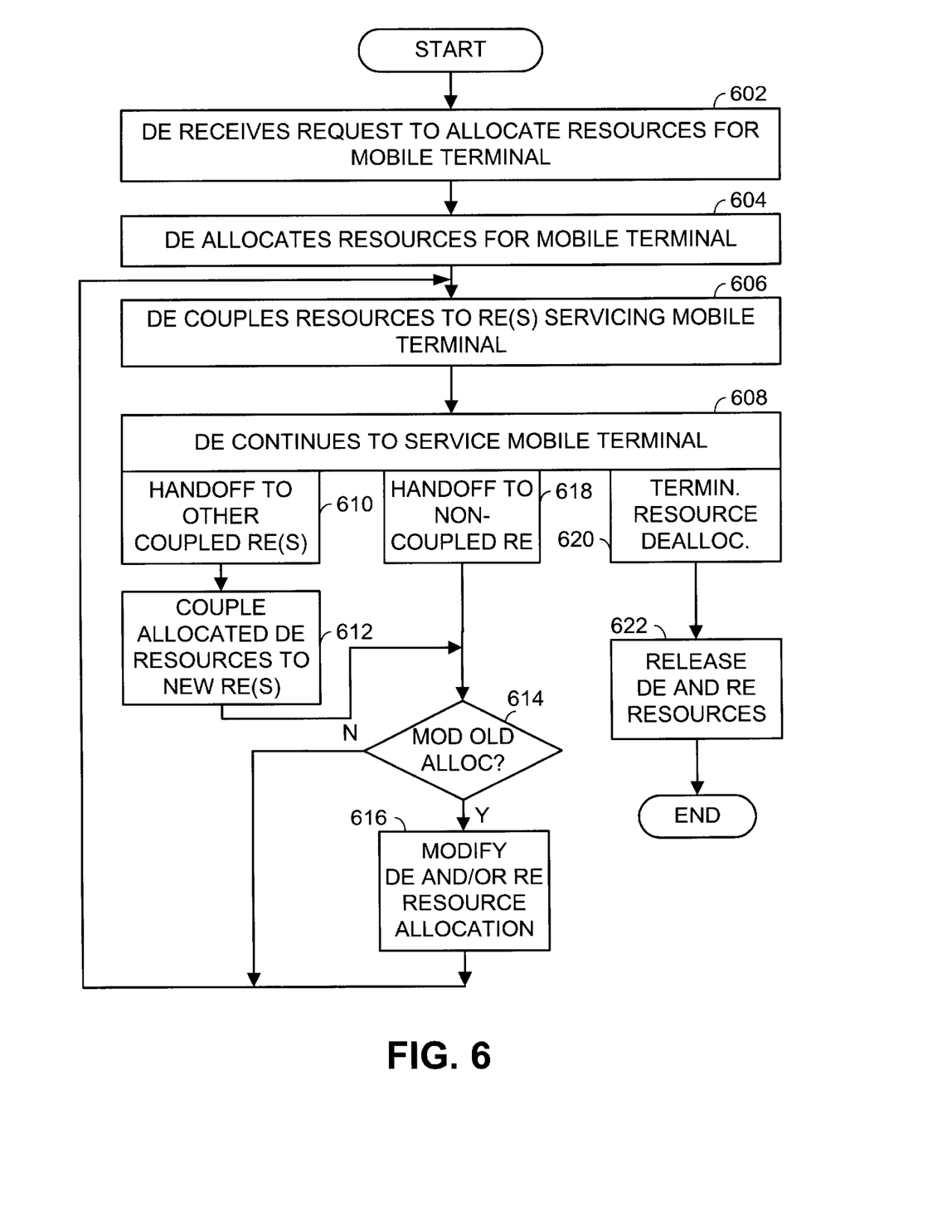
FIG. 6 is a logic diagram illustrating operation according to the present invention in allocating Digital Enclosure and Radio Enclosure resources to service wireless communications.

FIG. 6 is a logic diagram illustrating operation according to the present invention in allocating Digital Enclosure and Radio Enclosure resources to service wireless communications. The operations of FIG. 6 will be described in conjunction with the structure of FIG. 1. Operation commences when a mobile terminal 152 roams into (or initiates a call) within the service area of a DE 114 (step 602). If the mobile terminal 152 roams into, or initiates a call, within a cell serviced by RE 136, the BSC 104 and the DE 114 interact to allocate RE 136 resources (a CEM) and RE resources (one or more radio modules) to service the mobile terminal 152. The DE 114 then couples its assigned resources to the assigned resources of the RE 136, and the RE 136 services the mobile terminal 152.

Messaging between the mobile terminal 152 and RE 136, e.g., attach message, call origination message, etc. are similar to, or the same as currently used messaging. As contrasted to prior operations, at least the DE 114 and RE 136 operate differently than prior art implementations. In order to minimize the impact on any prior devices such as mobile terminal 152, operation according to the present invention may be embodied so as to be transparent to the mobile terminal 152.

With its resources allocated to service the mobile terminal 152, the DE 114 then services the mobile terminal 152 until a handoff or communication termination event occurs that relieves the DE of this servicing responsibility. As is known, in CDMA type systems, the mobile terminal 152 sends Pilot Strength Measurement Messages (PSMMs) or equivalent messages to the network infrastructure to indicate the cell/sector pilot signals (Ec/Io) that it receives are equal to or greater than the predefined thresholds (e.g., T_ADD or T_COM) it stores. Based upon the received strength (Ec/Io) of the pilot signal, the network infrastructure (BSC 104 in the current embodiment) determines that handoff operations should be undertaken. While a PSMM message may have resulted in a handoff event that led to the initial allocation of DE 114 and RE 136 resources to the mobile terminal, a PSMM message may also result in a handoff event that releases of the DE 114 and/or the RE 136 resources.

A first handoff event occurs when the mobile terminal 152 is in hand off with another RE, e.g., RE 138, that is serviced by the same DE 114 (step 610). In this operation, the DE 114 couples the newly allocated RE 138 resources to the DE 114 resources that it has previously allocated to the mobile terminal 152 (step 612). Referring to the structure of FIG. 3, the DE 114 resources allocated are a CEM and associated signal path resources. This type of resource sharing operation is analogous to "softer handoff" prior art systems. In a prior art system, softer handoff occurs when a mobile terminal roams between sectors of a single cell such that a single CEM is used to transmit forward link (base station to mobile terminal) signals and decode reverse link (mobile terminal to base station) signals in two sectors simultaneously.

According to the operation described at step 612 of FIG. 6 and described with reference to FIG. 1, a single CEM is used to service signal paths for both RE 136 and RE 138 when handoff occurs between these REs. As compared to the prior art when a single CEM is shared during softer handoff from sector to sector of a single cell, with the system of the present invention, a CEM may be shared when the mobile terminal 152 roams from cell to cell.

With the new RE resources allocated, the DE 114, in conjunction with the BSC 104 then determines whether the previously allocated RE 136 resources should be released (step 614). If so, the RE 136 resources are released (step 616) and operation returns to step 608. If not, operation simply returns to step 608. An example of this operation would occur during a handoff operation in which the handoff of mobile terminal 152 to RE 138 was completed immediately after allocated RE 138 resources. In such case, the RE 136 resources would be released. In a typical CDMA handoff operation, forward link transmissions are provided from both REs 136 and 138 for a handoff period. Then, the RE 136 resources would be released.

From step 608, a second operation occurs when the mobile terminal 152 roams to a cell/sector that is serviced by an RE, e.g., RE 128, that is not serviced by the currently serving DE 114 (see position of mobile terminal 156). In such an operation, resources in both DE 116 and RE 144 must be allocated to perform soft handoff for the mobile terminal 152. The new DE 116 and RE 144 resources are then allocated to the mobile terminal 152 to service the communication during handoff operations. Then, the DE 114, in conjunction with the BSC 104 determines whether the previously allocated DE 114 resources and the previously allocated RE 136 resources should be released (step 614). If so, the DE 114 resources and/or the RE 136 resources are released (step 616) and operation returns to step 608. If not, operation simply returns to step 608.

From step 608, a third operation occurs when the DE 114 and RE 136 resources that were previously allocated are no longer required (step 620). This operation may be initiated when the mobile terminal releases the call, when the other coupled terminal terminates the communication, or when a handoff operation has been completed such that the DE 114 resources and the RE 136 resources are no longer required. In such case, the DE 114 resources and the RE 136 resources are released (step 622) and operation for the RE 114 end. However, when the communication is still ongoing, but serviced by another DE 116 and RE 144 pair, those allocated resources remain allocated to service the communication.

Figure 7:
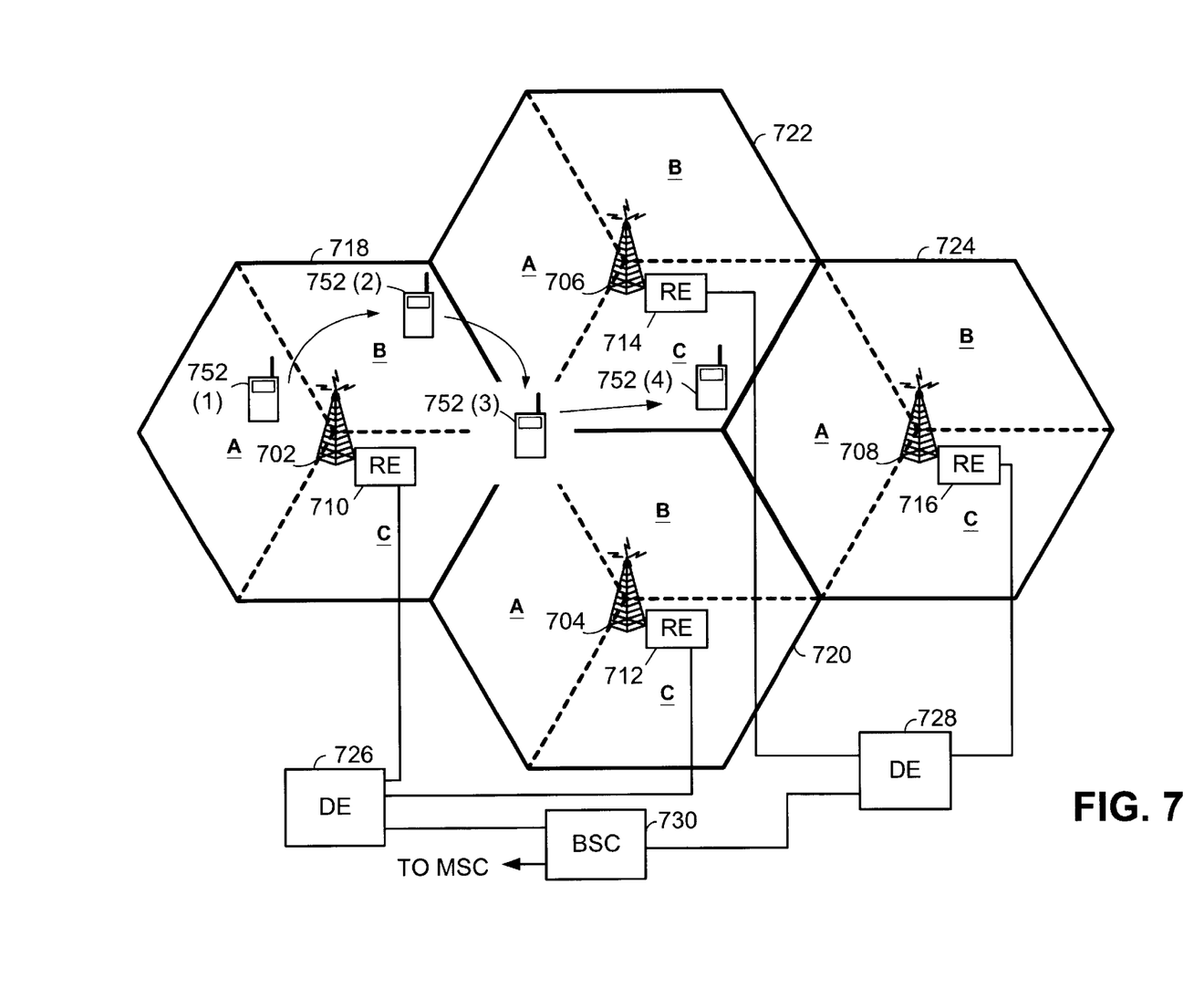
FIG. 7 is a block diagram illustrating a portion of a wireless network infrastructure constructed according to the present invention.

FIG. 7 is a block diagram illustrating a portion of a wireless network infrastructure constructed according to the present invention. DEs 726 and 728 couple to BSC 730 and to a plurality of REs 710, 712, 714, and 716. DE 726 services REs 710 and 712 while DE 728 services REs 714 and 716. Each of the REs services a respective cell having three sectors. RE 710 services sectors A, B, and C of cell 718, RE 712 services sectors A, B, and C of cell 720, RE 714 services sectors A, B, and C of cell 722, and RE 716 services sectors A, B, and C of cell 724. The REs 710, 712, 714, and 716 couple to towers/antennas 702, 704, 706, and 706, respectively, so that they may provide service within the cells/sectors.

In an operation according to the present invention, mobile terminal 752 originates (or receives) a call while at position (1) within sector A of cell 718. In servicing the call, the network infrastructure allocates DE 726 and RE 710 resources, e.g., a CEM and other required resources within DE 726 and a radio module within RE 710 that services communications for sector A of cell 718. The mobile terminal 752 then moves to position (2) within sector B of cell 718. During a corresponding handoff operation, another radio module within RE 710 that services sector B is allocated to the mobile terminal to service the communication within sector B of cell 718. After the mobile terminal 752 has moved completely out of sector A of cell 718, the RE 710 releases the radio module it used to service the call within sector A. Because RE 710 continues to service the call within sector A of cell 718, DE 726 continues to service the call using the same resources (CEM and other resources) that had been previously allocated.

The mobile terminal 752 then moves to position (3) such that it is in six way handoff between sectors B and C of cell 718, sectors A and C of cell 722 and sectors A and B of cell 720. Because RE 710 services both sectors B and C of sector 718, radio modules within RE 710 are retained/allocated to service sectors B and C of cell 718. Further, RE 712 allocates radio modules to service sectors A and B of cell 720. Further, the previously allocated CEM of DE 726 is employed to perform four-way handoff among sectors B and C of cell 718 via RE 710 and sectors A and B of cell 720 via RE 712. Further, a CEM of DE 728 and radio modules within RE 714 are allocated to perform two-way handoff among sectors A and C of cell 722.

The mobile terminal 752 then moves to position (4) within sector C of cell 722. At this location, RE 714 and DE 728 service the mobile terminal using a single radio module and the previously allocated CEM of DE 728. The radio modules of RE 710 and RE 712 as well as the resources of DE 726 are released. Further, the radio module of RE 714 that serviced sector A of cell 722 is also released. While the mobile terminal is in sector C of cell 722 the communication of the mobile terminal 752 terminates, at which time the resources of RE 714 and DE 728 are also released.

Figure 8:
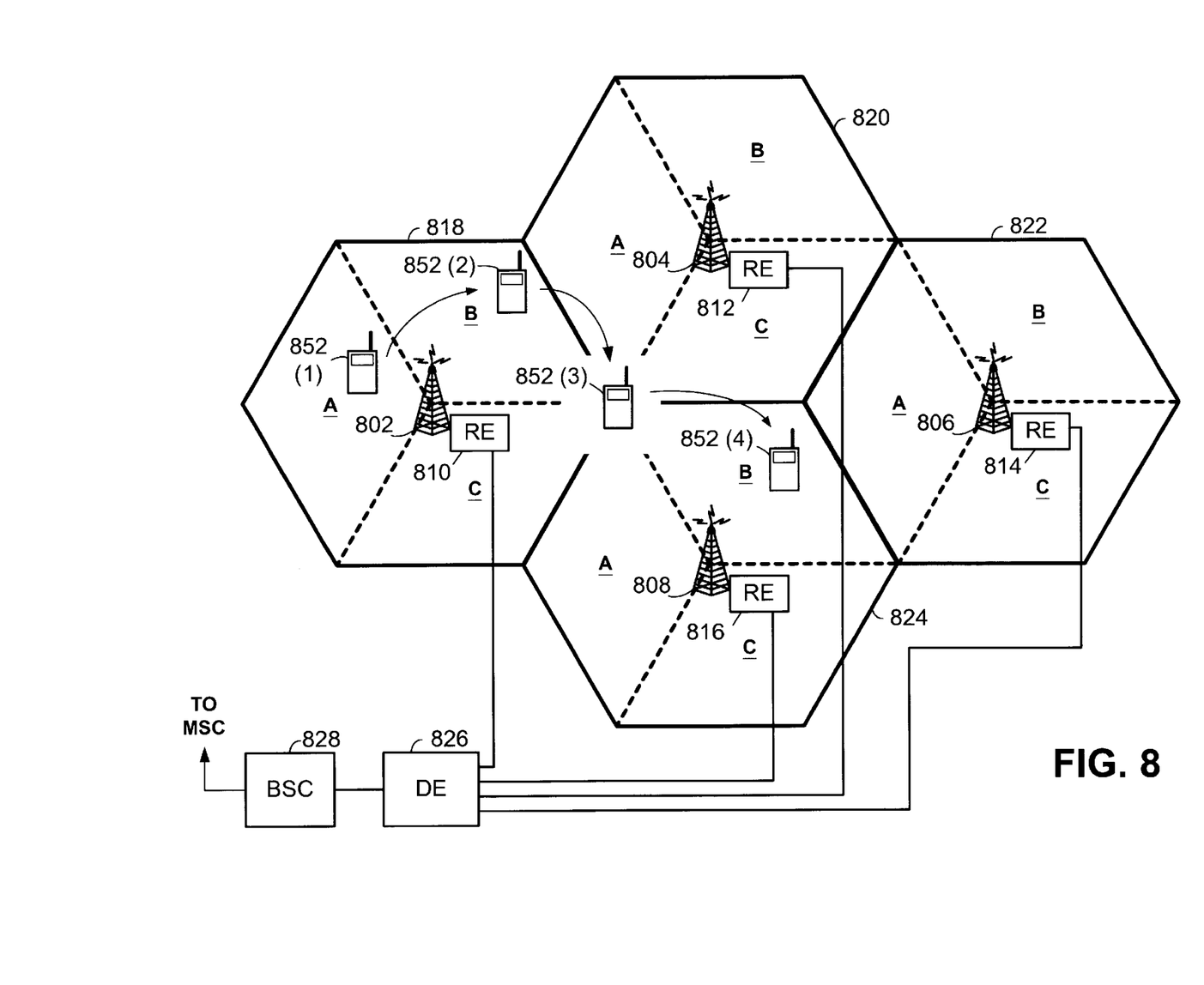
FIG. 8 is a block diagram illustrating a portion of another wireless network infrastructure constructed according to the present invention.

FIG. 8 is a block diagram illustrating a portion of another wireless network infrastructure constructed according to the present invention. DE 826 couples to BSC 828 and to a plurality of REs 810, 812, 814, and 816. Each of the REs services a respective cell having three sectors. RE 810 services sectors A, B, and C of cell 818, RE 812 services sectors A, B, and C of cell 820, RE 814 services sectors A, B, and C of cell 822, and RE 816 services sectors A, B, and C of cell 824. The REs 810, 812, 814, and 816 couple to towers/antennas 802, 804, 806, and 808, respectively, so that they may provide service within the sectors.

In an operation according to the present invention, mobile terminal 852 originates (or receives) a call while at position (1) within sector A of cell 818. In servicing the call, the network infrastructure allocates DE 826 and RE 810 resources, e.g., a CEM and other required resources within the DE 826 and a radio module within RE 810 that services communications for sector A of cell 818. The mobile terminal 852 then moves to position (2) within sector B of cell 818. During this handoff operation, another radio module within RE 810 is allocated to the mobile terminal to service the communication within sector B of cell 818. However, because RE 810 continues to service the call, DE 826 continues to service the call with the same resources (CEM and other resources) that had been previously allocated.

The mobile terminal 852 then moves to position (3) such that it is in six way handoff between sectors B and C of cell 818, sectors A and C of cell 820 and sectors A and B of cell 824. Because RE 810 services both sectors B and C of sector 818, radio modules within RE 810 are retained/allocated to service the sectors B and C of cell 818. Further, because RE 812 services sectors A and C of cell 820, radio modules within RE 812 are allocated to service sectors A and C of cell 820. Moreover, because RE 816 services sectors A and B of cell 824, radio modules within RE 816 are allocated to service the sectors A and B of cell 824. Further, because the allocated CEM of DE 826 includes six-signal paths, the allocated CEM (an other resources) of DE 826 is employed to perform six-way handoff among sectors B and C of cell 818 via RE 810, sectors A and C of cell 820 via RE 812, and sectors A and B of cell 824 via RE 816. As contrasted to a prior art operation that would require three separate CEMs to service the handoff operation, the system of the present invention performs the handoff operation using a single CEM.

The mobile terminal 852 then moves to position (4) within sector B of cell 824. At this location, RE 816 and DE 826 service the mobile terminal while the other resource allocations are released. While in sector B of cell 824 the communication of the mobile terminal 852 terminates.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A wireless communication system infrastructure that services wireless communications for mobile terminals operating in a service coverage area, the wireless communication system infrastructure comprising:
   a digital enclosure that includes a plurality of wireless communication processing components, wherein some of the plurality of wireless communication processing components perform digital processing functions including baseband signal processing;
   a plurality of radio enclosures coupled to the digital enclosure, wherein each of the plurality of radio enclosures services wireless communications within a corresponding geographic area of the service coverage area, and in doing so converts baseband signals to Radio Frequency (RF) signals and converts RF signals to baseband signals; and
   wherein two radio enclosures of the plurality of radio enclosures share a communication processing component of the digital enclosure while jointly servicing a single wireless communication, wherein the shared communication processing component of the digital enclosure performs baseband processing for each of the two radio enclosures.

2. The wireless communication system infrastructure of claim 1, wherein the two radio enclosures reside at respective geographic locations that are separated by a geographic distance.

3. The wireless communication system infrastructure of claim 2, wherein each radio enclosure of the plurality of radio enclosures services a respective cell.

4. The wireless communication system infrastructure of claim 2, wherein each radio enclosure of the plurality of radio enclosures services a set of sectors that form a respective cell.

5. The wireless communication system infrastructure of claim 1, further comprising:
   a base station controller that couples to the digital enclosure;
   at least one additional digital enclosure that couples to the base station controller and that includes a plurality of wireless communication processing components, wherein some of the plurality of wireless communication processing components perform digital processing functions;
   for each additional digital enclosure, a plurality of radio enclosures coupled to the additional digital enclosure that service wireless communications within corresponding geographic areas of the service coverage area; and
   a mobile switching center coupled to the base station controller.

6. The wireless communication system infrastructure of claim 1, wherein the digital enclosure comprises:
   a core that couples the digital enclosure to the plurality of radio enclosures;
   a plurality of channel elements coupled to the core, wherein each channel element performs digital processing functions for a wireless communication including baseband processing functions; and
   a control module that couples to the core.

7. The wireless communication system infrastructure of claim 6, wherein:
   the core couples a channel element to a plurality of radio enclosures during handoff of the wireless communication from a first cell serviced by a first radio enclosure to a second cell serviced by a second radio enclosure; and
   wherein the channel element performs digital processing functions to support the wireless communication in both the first cell and the second cell.

8. The wireless communication system infrastructure of claim 7, wherein:
   during handoff the first radio enclosure services the wireless communication within two sectors of the first cell; and
   the channel element performs digital processing functions to support the wireless communication for both of the two sectors of the first cell.

9. The wireless communication system infrastructure of claim 8, wherein:
   during handoff the second radio enclosure services the wireless communication within two sectors of the second cell; and
   the channel element performs digital processing functions to support the wireless communication for both of the two sectors of the second cell.

10. The wireless communication system infrastructure of claim 6, wherein the wireless communication system infrastructure operates according to a code division multiple access wireless operating standard.

11. A method of operating a wireless communication system to service wireless communications for a mobile terminal operating in a service coverage area, the method comprising:
    allocating the resources of a first radio enclosure to service a wireless communication for a mobile terminal;
    allocating the resources of a second radio enclosure to service the wireless communication for the mobile terminal;
    allocating wireless communication processing components within a digital enclosure to process the wireless communication;
    routing baseband signals corresponding to the wireless communication between the first radio enclosure and the digital enclosure;
    routing baseband signals corresponding to the wireless communication between the second radio enclosure and the digital enclosure; and
    wherein the first radio enclosure and the second radio enclosure share a communication processing component of the digital enclosure while jointly servicing the wireless communication, wherein the processing component of the digital component performs baseband processing functions for each of the first radio enclosure and the second radio enclosure.

12. The method of claim 11, wherein the first radio enclosure and the second radio enclosure reside at respective geographic locations that are separated by a geographic distance.

13. The method of claim 12, wherein:
    the first radio enclosure services the communication within a first cell; and the second radio enclosure services the communication within a second cell.

14. The method of claim 12, wherein:

the first radio enclosure services a plurality of sectors that form the first cell; and the second radio enclosure services a plurality of sectors that form the second cell.

15. The method of claim 11, further comprising:

routing the wireless communication between the digital enclosure and a base station controller; and routing the wireless communication between the base station controller and a mobile switching center.

16. The method of claim 11, wherein the communication processing component of the digital enclosure that jointly services the wireless communication comprises a channel element.

17. The method of claim 16, further comprising coupling the channel element to both the first radio enclosure and to the second radio enclosure during handoff of the wireless communication from a first cell serviced by the first radio enclosure to a second cell serviced by the second radio enclosure.

18. The method of claim 17, wherein:

during handoff the first radio enclosure services the wireless communication within two sectors of the first cell; and the channel element performs digital processing functions to support the wireless communication for both of the two sectors of the first cell.

19. The method of claim 18, wherein:

during handoff the second radio enclosure services the wireless communication within two sectors of the second cell; and the channel element performs digital processing functions to support the wireless communication for both of the two sectors of the second cell.

20. The method of claim 16, further comprising operating the first radio enclosure, the second radio enclosure, and the digital enclosure according to a code division multiple access wireless operating standard.

* * * * *